United States Patent [19]

Dübal et al.

[11] Patent Number: 5,286,409

[45] Date of Patent: Feb. 15, 1994

[54] LIQUID-CRYSTALLINE MIXTURES, IN PARTICULAR FERROELECTRIC LIQUID-CRYSTALLINE MIXTURES

[75] Inventors: Hans-Rolf Dübal, Königstein/Taunus; Claus Escher, Mühltal, both of Fed. Rep. of Germany; Takamasa Harada, Inzai, Japan; Wolfgang Hemmerling, Sulzbach, Fed. Rep. of Germany; Gerhard Illian, Frankfurt am Main, Fed. Rep. of Germany; Ingrid Müller, Niedernhausen, Fed. Rep. of Germany; Mikio Murakami, Kakegawa, Japan; Dieter Ohlendorf, Liederbach; Rainer Wingen, Hattersheim am Main, both of Fed. Rep. of Germany

[73] Assignee: Hoechst Aktiengesellschaft, Frankfurt am Main, Fed. Rep. of Germany

[21] Appl. No.: 768,561

[22] PCT Filed: Mar. 21, 1990

[86] PCT No.: PCT/EP90/00458

§ 371 Date: Nov. 6, 1991

§ 102(e) Date: Nov. 6, 1991

[87] PCT Pub. No.: WO90/11336

PCT Pub. Date: Oct. 4, 1990

[30] Foreign Application Priority Data

Mar. 22, 1989 [DE] Fed. Rep. of Germany ....... 3909356

[51] Int. Cl.[5] .................... C09K 19/34; C09K 19/20
[52] U.S. Cl. ........................... 252/299.61; 252/299.67
[58] Field of Search ........... 252/299.01, 299.2, 299.61, 252/299.66, 299.67; 359/103, 104

[56] References Cited

U.S. PATENT DOCUMENTS

| | | | |
|---|---|---|---|
| 4,855,429 | 8/1989 | Heppke et al. | 359/104 |
| 5,064,566 | 11/1991 | Hopf et al. | 252/299.61 |
| 5,071,589 | 12/1991 | Dübal et al. | 252/299.61 |

FOREIGN PATENT DOCUMENTS

| | | |
|---|---|---|
| 0248335 | 12/1987 | European Pat. Off. |
| 0275522 | 7/1988 | European Pat. Off. |
| 0288813 | 11/1988 | European Pat. Off. |
| 0292954 | 11/1988 | European Pat. Off. |
| 0355561 | 2/1990 | European Pat. Off. |
| 3831226 | 3/1989 | Fed. Rep. of Germany |

*Primary Examiner*—Robert L. Stoll
*Assistant Examiner*—Shean C. Wu
*Attorney, Agent, or Firm*—Curtis, Morris & Safford

[57] ABSTRACT

The novel liquid-crystalline mixtures (in the case of ferroelectric behavior they additionally contain an optically active compound as dope) are based on at least two mixture components of the general formula (I) and at least one carboxylate of the general formula (II), (III) or (IV).

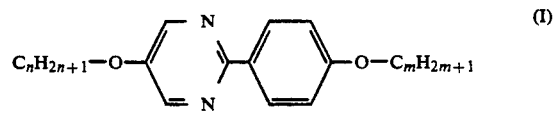

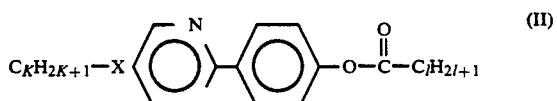

X = O or a single bond

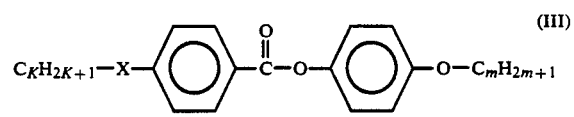

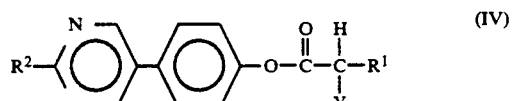

The mixtures have favorable properties for use in electrooptical display elements, such as high contrast, low melting point and short switching times.

15 Claims, No Drawings

LIQUID-CRYSTALLINE MIXTURES, IN PARTICULAR FERROELECTRIC LIQUID-CRYSTALLINE MIXTURES

Ferroelectric liquid crystals have recently attracted interest as a display medium in electrooptical assemblies (for example Lagerwall et al., "Ferroelectric Liquid Crystals for Displays", SID Symposium, October Meeting 1985, San Diego, Calif. USA).

For practical use of ferroelectric liquid crystals in electrooptical displays, chiral, tilted, smectic phases, such as $S_c$ phases, are required (R. B. Meyer, L. Liébert, L. Strzelecki and P. Keller, J. Physique 36, L-69 (1975)|, which are stable over a broad temperature range. This aim can be achieved by means of compounds which themselves form such phases, for example $S_c$ phases, or, however, by doping compounds which form non-chiral, tilted, smectic phases, with optically active compounds (M. Brunet, C. Williams, Ann. Phys. 3, 237 (1978)|.

Furthermore, a unitary planar orientation of the liquid crystals is necessary in order to achieve a high contrast ratio when ferroelectric liquid-crystal mixtures are used in electrooptical assemblies. It has been shown that a unitary planar orientation in the $S_c$ phase can be achieved if the phase sequence of the liquid-crystal mixture with decreasing temperature is as follows:

Isotropic T nematic T smectic A T smectic C.

(for example K. Flatischler et al., Mol. Cryst. Liq. Cryst. 131, 21 (1985); T. Matsumoto et al., p. 468–470, Proc. of the 6th Int. Display Research Conf., Japan Display, 30 Sep. - 2 Oct. 1986, Tokyo, Japan; M. Murakami et al., ibid., p. 344–347).

For ferroelectric (chiral smectic) liquid-crystal mixtures, the condition that the pitch of the helix must be large, i.e. greater than 5 μm, in the $S_c^*$ phase and must be very large, i.e. greater than 10 μm or infinite, in the N* phase must additionally be fulfilled.

The optical switching time $\tau[\mu s]$ of ferroelectric liquid-crystal systems, which should be as short as possible, depends on the rotation viscosity of the system $\gamma[mPas]$, the spontaneous polarization $P_s[nC/cm^2]$ and the electric field strength $E[V/m]$, in accordance with the equation $$\tau \approx \frac{\gamma}{P_s \cdot E}$$

Since the field strength E is determined by the electrode separation in the electrooptical assembly and by the applied voltage, the ferroelectric display medium must have low viscosity and high spontaneous polarization in order that a short switching time is achieved.

Finally, besides thermal, chemical and photochemical stability, a small optical anisotropy $\Delta n$, preferably $<0.13$, and a small positive or, preferably, negative dielectric anisotropy $\Delta \epsilon$ are required. (S. T. Lagerwall et al., "Ferroelectric Liquid Crystals for Displays" SID Symposium, Oct. Meeting 1985, San Diego, Calif., USA).

It is only possible to satisfy all these demands using mixtures comprising several components. The basis (or matrix) used here is preferably compounds which if possible themselves already have the desired phase sequence I→N→S₁→S_c. Further components of the mixture are often added to reduce the melting point and to broaden the $S_c$ and usually also the N phase, to induce optical activity, for pitch compensation and to match the optical and dielectric anisotropy; however, the rotation viscosity, for example, should if possible not be increased at the same time.

It is known that certain derivatives of phenylpyrimidine, in particular 5-alkyl-2(4-alkoxyphenyl)pyrimidines, are capable of forming $S_c$, $S_A$ and N phases (D. Demus and H. Zaschke, "Flüssige Kristalle in Tabellen", [Liquid Crystals in Tables], VEB Deutscher Verlag fur Grundstoffindustrie, Leipzig 1974, pp. 260-261) and, in addition, can be converted into ferroelectric liquid-crystal mixtures by addition of optically active dopes [L. M. Blinov et al., Sow. Phys. lisp. 27 (7), 492 (1984); L. A. Beresnew et al., Ferroelectrics, 59 (321]/1 (1984), presented at the 5th Conference of Soc. Countries on Liquid Crystals, Odessa, USSR, Oct. 1983; DE-A-3,515,347, EP-A 0,206,228 and EP-A 0,225,195].

It is furthermore known that lower melting points and a broadening of the liquid-crystalline phases desired can be achieved by mixing several liquid-crystalline compounds [D. Demus et al., Mol. Cryst. Liq. Cryst. 25, 215 (1974), J. W. Goodby, Ferroelectrics 49, 275 (1983)], and that the melting-point depression is the more pronounced the more the mixture components also differ structurally. (J. S. Dave et al., J. Chem. Soc. 1955, 4305). It was thus to be presumed that particularly low mixture melting points, and thus low phase-transition points of the $S_c$ phase, are obtained when compounds are mixed which, on the one hand, are significantly different structurally, but, on the other hand, are sufficiently similar to be readily miscible.

DE-C 2,257,588 discloses a 5-butoxy-2(4-pentoxyphenyl)-pyrimidine, but this only forms a nematic phase.

In DE 3,831,226.3, it has been found that, as the base component, compounds of the type 5-alkoxy-2(4-alkoxyphenyl)pyrimidines of the general formula (I)

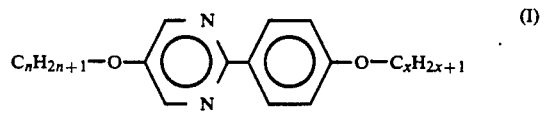

in which $C_nH_{2n+1}$ and $C_xH_{2x+1}$ are straight-chain alkyl radicals in which n is an integer from 6 to 14 and x is an integer f rom 2 to 14, are particularly highly suitable [lacuna] the matrix (base) for liquid-crystalline mixtures, in particular ferroelectric liquid-crystalline mixtures; of them, at least two different compounds a' and a'' are present in the mixture. For the most part, they exhibit the desired phase sequence $ITNTS_ATS_c$ with decreasing temperature. Compared with the known 5-alkyl-2-(4-alkoxyphenyl)pyrimidines, they have considerably broader $S_c$ phases and higher transition temperatures of the $S_cTS_A$ transition. In addition, the $S_c$ phase is even formed in the case of a lower number of carbon atoms in the alkyl(oxy) chains, for example even when n = 8 and x 2 or n = 6 and x 6. Compared with the known 5-alkyl-2-(4-alkoxyphenyl)pyrimidines, this gives a greater choice of homologous, readily miscible compounds having $S_c$ phases for preparing the mixture. Due to their higher phase-transition temperatures $S_A$ to $S_c$ (for example 70° to 90° C.) and their broader $S_c$ phases, they also make it possible to prepare mixtures having very broad $S_c$ phases (for example up to about 68° C.) and high transition temperatures $S_A/S_c$.

The mixtures of DE 3,831,226.3 of compounds of the formula (I) are already very highly suitable as a matrix for ferroelectric liquid-crystalline mixtures. However, they also have a large optical anisotropy ($\Delta n$) and a large positive dielectric anisotropy ($\Delta \epsilon$). In addition, the nematic phase, depending on the chain length n or x of the substituents, is still narrow.

By adding at least one compound (cyclohexanecarboxylate) of the general formula (II), i.e. a compound of type b,

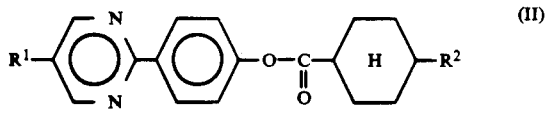

the parameters [$\Delta n$] and [$\Delta \epsilon$] can simultaneously be optimized and the width of the nematic phase can be matched to practical requirements.

In the general formula (II):

$R^1$ is an alkyl chain having 10 to 16 carbon atoms or an alkoxy chain having 8 to 14 carbon atoms, and $R^2$ is an alkyl chain having 2 to 9 carbon atoms. These compounds are described in DE-A 3,731,639. They develop their favorable action even when added in amounts from about 2 mol %, relative to the mixture of the components of type a and b. When added in amounts from about 10 and up to about 40 mol %, the nematic phase is broadened by about 8 to 18° C. and the smectic phase by about 6° to 15° C. In addition, it is very advantageous that the addition only insignificantly increases the rotation viscosity of the base mixture according to the invention, which is already very low per se.

The melting point and the lower phase-transition temperature of the $S_c$ phase of the mixtures can be reduced, if they are too high, by adding at least one compound (alkenyloxyphenylpyrimidine derivative) of the general formula (III), i.e. a compound of type c, to mixtures of compounds of type a alone or additionally containing compounds of type b:

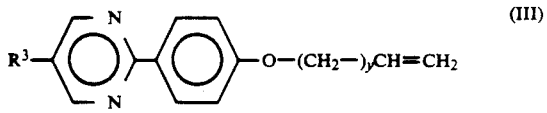

In the general formula (III), $R^3$ is a branched or straight-chain alkyl radical having 7 to 16 carbon atoms or a straight-chain or branched alkoxy radical having 6 to 14 carbon atoms, and y is an integer f rom 4 to 14. These compounds are described in DE-A 3,731,638. Added amounts of from about 10 to 35 mol %, relative to the overall mixture, reduce the lower temperature limit of the $S_c$ phase by up to 5° C. The other favorable physical properties of the mixtures are generally not impaired by this addition.

To reduce the melting point and the lower temperature limit of the $S_c$ phase, it is also possible to add, together with or in place of compounds of type c, other compounds of the formula (IV), i.e. of type d,

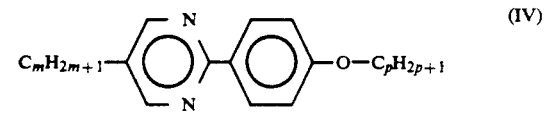

where m and p, independently of one another, are integers from 6 to 14. When amounts of from about 10 to 25 mol % of the compound of type d or mixtures with compounds of type c, relative to the overall mixture, are added to mixtures of compounds of type a or a and b, the lower temperature limit of the $S_c$ phase is reduced by up to 10° C.

Some of these components, and also certain mixtures, are already known from the prior art. However, since the development, in particular of ferroelectric liquid-crystal mixtures, can in no way be regarded as complete, the manufacturers of display elements are interested in a very wide variety of mixtures. A further reason for this, amongst others, is that conclusions on the quality of the liquid-crystalline mixtures too can only be made by considering the interactions of the liquid-crystalline mixtures with the individual assemblies of the display elements or of the cells (for example the orientation layer).

The object of the present invention is therefore to provide compositions of suitable components for liquid-crystalline base mixtures, but also for ferroelectric liquid-crystalline mixtures, which satisfy as many as possible of the abovementioned criteria, have, in particular, a low melting point and furthermore result in improved contrast in a display.

The invention relates to the liquid-crystalline base mixtures characterized below, which contain, on the one hand, compounds A from DE 3,831,226.3, but, on the other hand, also contain at least one carboxylate C of the general formula (V), (VI), (VII), (VIII) or (IX) as a mixture component.

The invention furthermore relates to liquid-crystalline mixtures having favorable values for the optical anisotropy and the dielectric anisotropy and having a broad nematic phase which is sufficient for practical use.

A preferred subject-matter of the invention are likewise ferroelectric liquid-crystalline mixtures having a short switching time, the phase sequence I→N*→$S_A$, $S_c$*, the pitch in the nematic phase being >15 μm and in the $S_c$* phase being >5 μm, and having a negative $\Delta \epsilon$ and $\Delta n$<0.15, and which contain a chiral dope C in addition to the components A and the carboxylates B.

The novel invention relates to liquid-crystalline mixtures containing, as component A, at least two 5-alkoxy-2-(alkoxyphenyl)pyrimidines of the general formula (I)

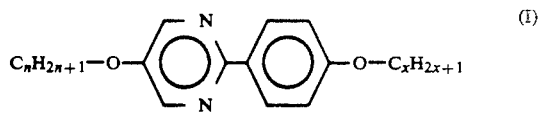

in which the alkyl radicals are straight-chain alkyl radicals in which n is an integer from 6 to 14 and x is an integer from 2 to 14, and, if appropriate, one or more cyclohexanecarboxylates of the general formula (II)

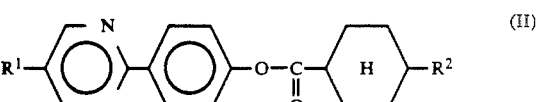

in which $R^1$ is an alkyl radical having 10 to 16 carbon atoms or an alkoxy radical having 8 to 14 carbon atoms, and $R^2$ is an alkyl radical having 2 to 9 carbon atoms, and, if appropriate, one or more alkenyloxyphenylpyrimidine derivatives of the general formula (III)

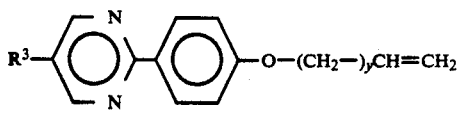

(III)

in which $R^3$ is an alkyl chain having 7 to 16 carbon atoms or an alkoxy chain having 6 to 14 carbon atoms, and y is an integer from 4 to 14, and, if appropriate, one or more alkylpyrimidinealkoxyphenyl derivatives of the general formula (IV)

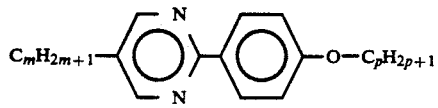

(IV)

in which m and p, independently of one another, are integers from 6 to 14, and if appropriate as component B (for ferroelectric liquid-crystal mixtures), at least one optically active compound from the group
a) optically active esters made from α-chlorocarboxylic acids and mesogenic phenols,
b) optically active esters of N-acylproline,
c) optically active esters of 1,3-dioxolane-4-carboxylic acids, and
d) optically active esters of oxirane-2-carboxylic acids, wherein the liquid-crystal mixtures furthermore contain at least one carboxylate of the general formula (V), (VI), (VII), (VIII) or (IX) as a mixture component:

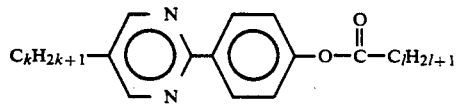

(V)

where
k may be an integer from 6 to 14, and
l may be an integer from 2 to 14,

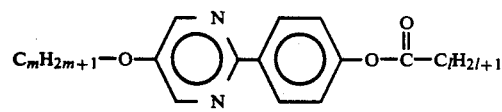

(VI)

where
m may be an integer from 5 to 14, and
l may be an integer from 2 to 14,

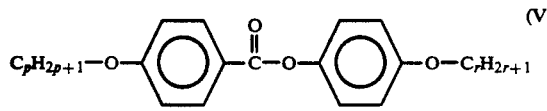

(VII)

where
p may be an integer from 7 to 14, and
r may be an integer from 4 to 14,

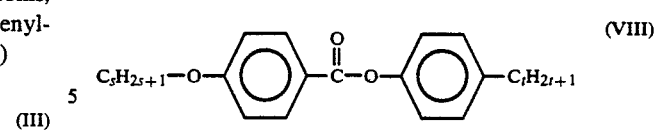

(VIII)

where
s may be an integer from 6 to 14, and
t may e an integer from 6 to 14,

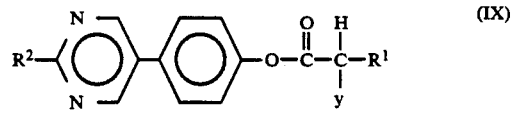

(IX)

where
$R^2$ is straight-chain or branched ($C_1$-$C_{12}$)alkyl or alkenyl, it being possible for one or two non-adjacent $CH_2$ groups to be replaced by O and/or S atoms,
Y is F, Cl, Br, CN or $CF_3$ and
$R^1$ is branched ($C_3$-$C_9$)alkyl, benzyl or phenyl.

Preferred liquid-crystal mixtures are those which contain, as component C, at least one 4-(5-alkylpyrimidin-2-yl)phenyl carboxylate of the general formula (V)

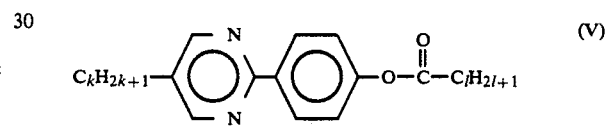

(V)

where
k may be an integer from 6 to 14, and
l may be an integer from 4 to 14.

Likewise preferred mixtures are those which contain, as component C, at least one 4-(5-alkoxypyrimidin-2-yl)-phenyl carboxylate of the general structure (VI)

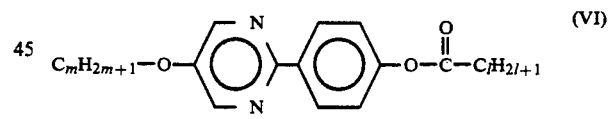

(VI)

where
m may be an integer from 6 to 14, and
l may be an integer from 4 to 14.

Preferred liquid-crystalline mixtures are also those which contain, as component C, at least one benzoate of the general structure (VII)

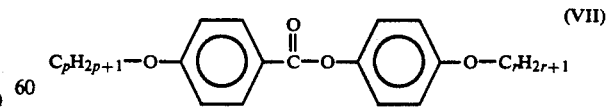

(VII)

where
p may be an integer from 7 to 14, and
r may be an integer from 4 to 14.

Likewise preferred mixtures are those which contain, as component C, at least one benzoate of the general structure (VIII)

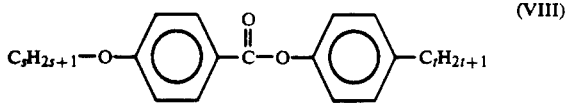

where
s may be an integer from 6 to 14, and
t may be an integer from 6 to 14.

In addition, preferred mixtures are those which contain, at least as one component, a racemate of the structure (IX)

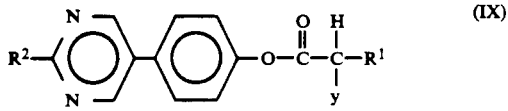

where
$R^2$ is straight-chain or branched ($C_1$–$C_{12}$)alkyl or alkenyl, it being possible for one or two non-adjacent $CH_2$ groups to be replaced by O and/or S atoms,
Y is F, Cl or $CF_3$ and
$R^1$ is branched ($C_3$–$C_9$)alkyl, benzyl or phenyl.

Particularly preferred liquid-crystal mixtures are those which contain, as component C, the racemate of at least one α-halocarboxylate of the structure (IXa)

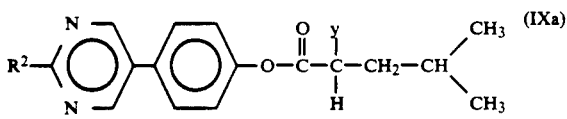

where $R^2$ may be an alkyl radical or an alkenyl radical having 1 to 12 carbon atoms whose $CH_2$ group bonded to the aromatic rings may also be replaced by O and/or [lacuna], and y is F or Cl.

Very particularly suitable here are the α-halocarboxylic acids of the structures (IXb) and (IXc)

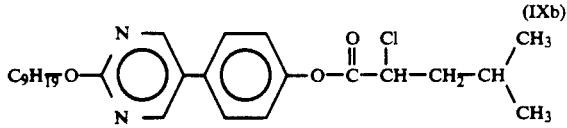

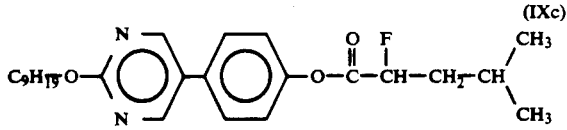

It has now been found that the FLC mixtures according to the invention which contain, as component C, 2 to 25 mol-%, in particular 10 to 25 mol-%, of mixtures of individual compounds of the general structures (V) and/or (VI) and/or (VIII) and/or (VIII) and/or (IX) have an upper phase-transition point which is up to 10°

C. lower than the corresponding mixtures without the components according to the invention.

Furthermore, the contrast is increased by up to 10% and, in some cases, the switching times are also reduced by the addition.

Through the specific addition of the abovementioned compounds of the formulae (V to IX), the physical parameters [Δn] and [Δε] of the mixture can be optimized, i.e. matched to the particular specific requirements of the display element.

Surprisingly, it has furthermore been observed that liquid-crystalline mixtures which contain 2 to 15 mol-% of racemic mixtures of one or more esters of the general structure (IX) have a melting point which is lower by up to 5° C. and an upper $S_c$ phase transition point which is lower by up to 10° C. than the corresponding base mixture without this (these) component(s). The contrast of the mixtures according to the invention is up to 20% higher than that of the base mixtures. Doping with a racemic mixture of the α-chlorocarboxylate (IXb)

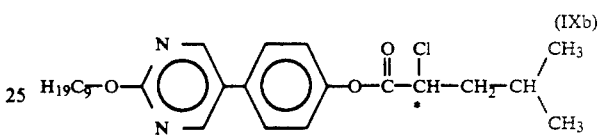

has proven particularly suitable here.

The liquid-crystal mixtures according to the invention are suitable both as base mixtures and, when chiral dopes B are added, as novel ferroelectric liquid-crystal mixtures which are particularly suitable for practical use in electrooptical switching and display elements.

As already proposed (DE 3,831,226.3), the following dopes have proven particularly suitable for the purpose of the invention:

a) optically active esters made from α-chlorocarboxylic acids and mesogenic phenols as in DE-A 3,703,228, and, in particular, the optically active ester of the formula below

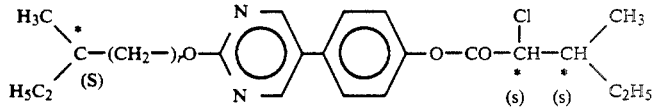

where r = 4 to 8 b) optically active esters of N-acylproline as in DE-A 3,644,522
c) optically active esters of 1,3-dioxolane-4-carboxylic acids as in DE-A 3,713,273
d) optically active esters of oxirane-2-carboxylic acids as in DE-A 3,718,174.

These dopes frequently induce ferroelectric behavior even when added in small amounts from 0.5 and in particular from 3 mol-%, relative to the overall mixture. The upper limit for the amount added is 30 mol-%.

The addition of these dopes generally further reduces the melting point and the lower temperature limit of the $S_c*$ phase. In addition, depending on the nature and amount of the dope, the upper temperature limit of the $S_c*$ phase may be reduced or increased and the width of the $N*$ phase may be changed, which should be taken into account when preparing the matrix mixture. As is known, the optically active dope induces helical twisting in the $S_c$ phase and in the N phase, which converts these phases into the $S_c*$ phase and $N*$ phase respectively. The pitch and the rotation sense of these helices in the N* phase depend on the nature and amount of the optically active dope. They must frequently be compensated by adding a further dope which induces a helix with the opposed rotation sense. In general, a ferroelectric liquid-crystal mixture should have a helix with a pitch of greater than 10 μm in the N* phase and of at least 5 μm in the $S_c$* phase. The compounds used for compensation of the pitch should preferably not induce in the mixture any spontaneous polarization or should only do so to a negligibly small extent, or should induce a spontaneous polarization with the same sign as the optically active dope.

If pitch compensation is necessary, the following combinations are particularly suitable in the mixtures according to the invention:

a₁) Optically active α-chlorocarboxylates induce a negative $P_s$ and a helix with negative rotation sense. For compensation, derivatives of citronellol of the general formula (N) are advantageously added

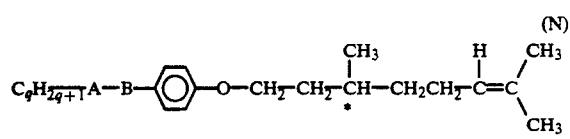

In this formula, q is an integer from 6 to 16, A is an oxygen atom or a chemical bond, and B is a pyrimidine-2,5-diyl ring, it being possible for the phenylene ring bonded thereto to be in the 2- or 5-position. For pitch compensation, up to 4 mol %, relative to the overall mixture, or one mole of citronellol derivative are required per 7 to 13 moles of α-chlorocarboxylate.

b₁) Optically active N-acylproline esters having the S configuration at the asymmetric carbon atom which induce a positive $P_s$ and a negative pitch in the mixtures according to the invention can be compensated by adding optically active oxirane-2-carboxylates as in DE-A 3,718,174 having a positive $P_s$ and, in particular, a 2-R-3-R configuration. The amount to be added is up to 6 mol %, relative to the overall mixture or 1 mole of oxirane-2-carboxylate per 5 to 9 moles of N-acylproline ester.

c₁) The compensation in the case of optically active 1,3-dioxolane-4-carboxylates having the R configuration, which likewise induce a positive $P_s$ and a negative pitch, is likewise expediently carried out as described under b,) using oxirane-2-carboxylates.

The use of oxirane-2-carboxylates as described in b₁) and c₁) has the additional advantage that these compounds themselves induce a very high positive $P_s$ and thus increase the $P_s$ of the overall mixture and shorten the switching time.

The values of spontaneous polarization $P_s$ [nC /CM²], the contrast K, the optical switching time τ [μs], the dielectric anisotropy Δε and the optical anisotropy Δn were determined for the ready-to-use ferroelectric liquid-crystal mixtures (all measurements at 25° C.).

The $P_s$ values are measured by the method of H. Diamant et al. (Rev. Sci. Instr., 28, 30, 1957), where measurement cells with an electrode separation of 2 μm and ground polyamide as the orientation layer are used.

To determine τ and K, the measurement cell is clamped between crossed analyzer and polarizer on the rotary stage of a polarizing microscope.

To determine the contrast (K), the measurement cell is positioned, by rotation, so that a photodiode indicates minimum light transmission (dark state). The microscope illumination is adjusted so that the photodiode indicates the same light intensity for all cells. After a switching operation, the light intensity changes (bright state), and the contrast is calculated from the ratio of the light intensities in these states.

The switching time τ is determined using a photodiode by measuring the time taken for the light signal to increase from a signal height of 10 to 90 %. The switching voltage comprises rectangular pulses and is +10 V/μm.

The phase-transition temperatures are determined using a polarizing microscope from the texture changes on heating. By contrast, the melting point is determined using a DSC instrument. The phase-transition temperatures between the phases

| Nematic | (N or N*) |
|---------|-----------|
| Smectic-C | ($S_c$ or $S_c$*) |
| Smectic-A | ($S_A$ or $S_A$*) |
| Crystalline | (X) | are given in °C., and the values are between the phase symbols in the phase sequence.

Example 1 a) a liquid-crystalline mixture comprising the following eight components

| | |
|---|---|
| 5-octoxy-2-(4-hexoxyphenyl)pyrimidine | 14 mol-% |
| 5-octoxy-2-(4-octoxyphenyl)pyrimidine | 5 mol-% |
| 5-octoxy-2-(4-butoxyphenyl)pyrimidine | 15 mol-% |
| 5-octoxy-2-(4-decoxyphenyl)pyrimidine | 8 mol-% |
| 5-octoxy-2-(4-dodecoxyphenyl)pyrimidine | 8 mol-% |
| 5-octyl-2-(4-decoxyphenyl)pyrimidine | 13 mol-% |
| [4-(5-decylpyrimidin-2-yl)]phenyl trans-4-pentylcyclohexanecarboxylate | 17 mol-% |
| 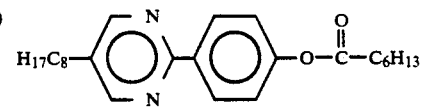 | |
| [4-(5'-octylpyrimidin-2-yl)]phenyl heptanoate (= compound of the general formula V) | 20 mol-% | exhibits the following liquid-crystalline phase ranges:
X −5 $S_c$ 71 $S_A$ 78 N 93 I b) The following mixture, which is claimed in DE 3,831,226.3 and differs from the mixture 1a only in that it contains no component of the general formula V, is suitable for comparing the physical properties. This mixture comprising seven components has the following liquid-crystalline phase ranges:

| X −1 | $S_c$ 81 | $S_A$ 87 | N 103 | I |
|------|----------|----------|-------|---|

Compared with the mixture 1b, the mixture 1a according to the invention has a melting point (X) which is lower by 4° C. and an upper $S_c$ phase-range limiting temperature which is lower by 10° C.

Example 2 a) A liquid-crystalline mixture comprising the following eight components

| | |
|---|---|
| 5-octoxy-2-(4-hexoxyphenyl)pyrimidine | 16 mol-% |
| 5-octoxy-2-(4-octoxyphenyl)pyrimidine | 6 mol-% |
| 5-octoxy-2-(4-butoxyphenyl)pyrimidine | 15 mol-% |
| 5-octoxy-2-(4-decoxyphenyl)pyrimidine | 8 mol-% |
| 5-octoxy-2-(4-dodecoxyphenyl)pyrimidine | 8 mol-% |
| 5-octyl-2-(4-dodecoxyphenyl)pyrimidine | 13 mol-% |
| [4-(5-decylpyrimidin-2-yl)]phenyl trans-4-pentylcyclohexanecarboxylate | 19 mol-% |

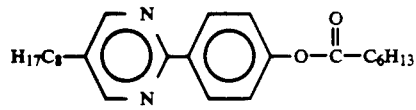

| | |
|---|---|
| [4-(5'-octylpyrimidin-2-yl)]phenyl heptanoate (= compound of the general formula V) | 15 mol-% | exhibits the following liquid-crystalline phase ranges:

| X −5 | $S_c$ 75 | $S_A$ 80 | N 87 | I |
|---|---|---|---|---| b) The following mixture, which is claimed in DE 3,831,226.3 and differs from the mixture 2a only in that it contains no component of the general formula V, is suitable for comparing the physical properties. This mixture comprising seven components has the following liquid-crystalline phase ranges:

| X −2 | $S_c$ 81 | $S_A$ 86 | N 104 | I |
|---|---|---|---|---|

Compared with the mixture 2b, the mixture 2a according to the invention has a melting point which is lower by 3° C. and an upper $S_c$ phase-range limiting temperature which is lower by 6° C.

Example 3 a) A liquid-crystalline mixture comprising the following eight components

| | |
|---|---|
| 5-octoxy-2-(4-decoxyphenyl)pyrimidine | 15 mol-% |
| 5-octoxy-2-(4-octoxyphenyl)pyrimidine | 6 mol-% |
| 5-octoxy-2-(4-butoxyphenyl)pyrimidine | 15 mol-% |
| 5-octoxy-2-(4-decoxyphenyl)pyrimidine | 8 mol-% |
| 5-octoxy-2-(4-dodecoxyphenyl)pyrimidine | 8 mol-% |
| 5-octyl-2-(4-dodecoxyphenyl)pyrimidine | 14 mol-% |
| [4-(5-decylpyrimidin-2-yl)]phenyl trans-4-pentylcyclohexanecarboxylate | 14 mol-% |

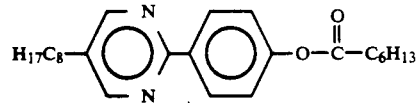

| | |
|---|---|
| [4-(5-octylpyrimidin-2-yl)]phenyl heptanoate (= compound of the general formula V) | 20 mol-% | exhibits the following liquid-crystalline phase ranges:

| X −3.5 | $S_C$ 69 | $S_A$ 80 | N 92 | I |
|---|---|---|---|---| b) The following mixture, which is claimed in DE 3,831,226.3 and differs from the mixture 3a only in that it contains no component of the general formula V, is suitable for comparing the physical properties. This mixture comprising seven components has the following liquid-crystalline phase ranges:

| X 0 | $S_c$ 80 | $S_A$ 88 | N 102 | I |
|---|---|---|---|---|

In comparison, the mixture 3a according to the invention has a melting point which is 3.5° C. lower and an upper $S_c$ phase-range limiting temperature which is 11° C. lower.

Example 4 a) A liquid-crystalline mixture comprising the following eight components

| | |
|---|---|
| 5-octoxy-2-(4-hexoxyphenyl)pyrimidine | 16 mol-% |
| 5-octoxy-2-(4-octoxyphenyl)pyrimidine | 6 mol-% |
| 5-octoxy-2-(4-butoxyphenyl)pyrimidine | 16 mol-% |
| 5-octoxy-2-(4-decoxyphenyl)pyrimidine | 8 mol-% |
| 5-octoxy-2-(4-dodecoxyphenyl)pyrimidine | 8 mol-% |
| 5-octyl-2-(4-dodecoxyphenyl)pyrimidine | 14 mol-% |
| [4-(5-decylpyrimidin-2-yl)]phenyl trans-4-pentylcyclohexanecarboxylate | 22 mol-% |

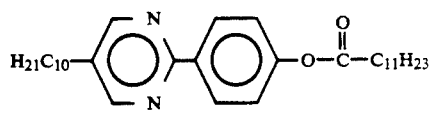

| | |
|---|---|
| 4-(5-decylpyrimidin-2-yl)phenyl dodecanoate (= compound of the general formula V) | 10 mol-% | exhibits the following liquid-crystalline phase ranges:

| X −5.5 | $S_c$ 79 | $S_A$ 84 | N 94 | I |
|---|---|---|---|---| b) The following mixture, which is claimed in DE 3,831,226.3 and differs from the mixture 4a only in that it contains no component of the general formula V, is suitable for comparing the physical properties. This mixture comprising seven components has the following liquid-crystalline phase ranges:

| X −2 | $S_c$ 81 | $S_A$ 86 | N 104 | I |
|---|---|---|---|---|

In comparison, the mixture 4a according to the invention has a melting point which is 3.5° C. lower and an upper $S_c$ phase-range limiting temperature which is 2° C. lower.

Example 5 a) A liquid-crystalline mixture comprising the following nine components

| | |
|---|---|
| 5-octoxy-2-(4-decoxyphenyl)pyrimidine | 7.5 mol-% |
| 5-octoxy-2-(4-octoxyphenyl)pyrimidine | 4 mol-% |
| 5-octoxy-2-(4-hexoxyphenyl)pyrimidine | 9 mol-% |
| 5-octoxy-2-(4-butoxyphenyl)pyrimidine | 9.5 mol-% |
| 5-octyl-2-(4-decoxyphenyl)pyrimidine | 9.5 mol-% |
| 5-octyl-2-(4-hexoxyphenyl)pyrimidine | 14 mol-% |
| 5-octyl-2-(4-octoxyphenyl)pyrimidine | 13 mol-% |
| [4-(5-decylpyrimidin-2-yl)]phenyl trans-4-pentylcyclohexanecarboxylate | 28.5 mol-% |

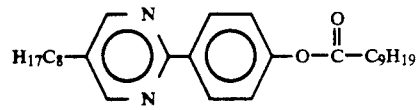

| | |
|---|---|
| 4-(5-octylpyrimidin-2-yl)phenyl decanoate (= compound of the general formula V) | 5 mol-% | exhibits the following liquid-crystalline phase ranges:

| X −3 | $S_c$ 68 | N 94 | I |
|---|---|---|---| b) A comparable mixture which differs from the mixture 5a only in that it contains no component of the general formula V has the following liquid-crystalline phase ranges:

| X −2 | $S_c$ 80 | N 99 | I |
|---|---|---|---|

The addition of the component of the general formula V has thus resulted in a reduction of the melting point by 1° C.

Example 6 a) A liquid-crystalline mixture comprising the following eight components

| | |
|---|---|
| 5-octoxy-2-(4-hexoxyphenyl)pyrimidine | 16 mol-% |
| 5-octoxy-2-(4-octoxyphenyl)pyrimidine | 6 mol-% |
| 5-octoxy-2-(4-butoxyphenyl)pyrimidine | 15 mol-% |
| 5-octoxy-2-(4-decoxyphenyl)pyrimidine | 8 mol-% |
| 5-octoxy-2-(4-dodecoxyphenyl)pyrimidine | 8 mol-% |
| 5-octyl-2-(4-dodecoxyphenyl)pyrimidine | 13 mol-% |
| [4-(5-decylpyrimidin-2-yl)]phenyl trans-4-pentylcyclohexanecarboxylate | 19 mol-% |

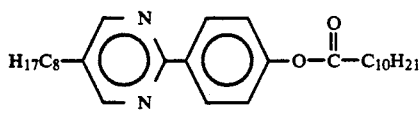

| | |
|---|---|
| 4-(5-octylpyrimidin-2-yl)phenyl undecanoate (= compound of the general formula V) | 15 mol-% | exhibits the following liquid-crystalline phase ranges:

| X −5 | $S_c$ 75 | $S_A$ 80 | N 87 | I |
|---|---|---|---|---|

In comparison, the mixture 6a according to the invention has a melting point which is 3° C. lower and an upper $S_C$ phase-range limiting temperature which is 6° C. lower.

Example 7

The following ferroelectric mixtures comprising the following components

X mol % of the mixture from Example 2b

Y mol % of

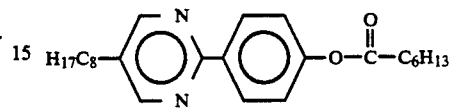

[4-(5'-octylpyrimidin-2-yl)]phenyl heptanoate (compound of the general formula V)

6 mol % of

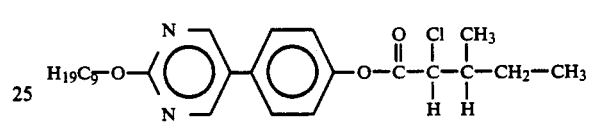

4-(2-nonoxypyrimidin-5-yl)phenyl (2S,3S)-2-chloro-3-methylpentanoate

In Table 1 below, the property features of the examples are reproduced in a summarized form.

TABLE 1

| | Concentration | | Contrast | Switching time | Polarization | Phase-transition temperatures | | | |
|---|---|---|---|---|---|---|---|---|---|
| | X | Y | | $\tau$ | $P_s$ | X→$S_c^*$ | $S_c^*$→$S_A^*$ | $S_A^*$→N* | N*→I |
| Example | Mol % | Mol % | K | $\mu$s | nC·cm$^{-2}$ | °C. | °C. | °C. | °C. |
| 7a | 94 | 0 | 6.4 | 75 | −10 | −1 | 80 | 85 | 99 |
| 7b | 79 | 15 | 4.6 | 65 | −10.5 | −8 | 73 | 79 | 92 |

The results in columns 5 and 7 show very clearly the improvement in the switching time by 10 $\mu$s and in the melting point by 7° C. with increased concentration of the compound of the general formula V.

b) The following mixture, which is claimed in DE 3,831,226.3 and differs from the mixture 6a only in that it contains no component of the general formula

Example 8 a) A ferroelectric mixture comprising the following components

| mixture from Example 2a | 94 mol-% |
|---|---|

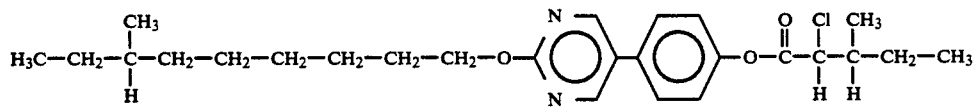

6 mol-%

4-[2-((S)-7-methylnonoxy)pyrimidin-5-yl]phenyl (2S,3S)-2-chloro-3-methylpentanoate
exhibits the following LC ranges

| X −9 | $S_c^*$ 72 | $S_A^*$ 78 | N* 93 | I |
|---|---|---|---|---|

V, is suitable for comparing the physical properties.
This mixture comprising seven components has the following liquid-crystalline phase ranges:

| X −2 | $S_c$ 81 | $S_A$ 86 | N 104 | I |
|---|---|---|---|---|

At 25° C., this mixture has a polarization of −9 nC.cm$^{-2}$ and, in a switching field of 10 V$\mu$m$^{-1}$, a switching time of 55 $\mu$s.

For comparison, a mixture based on the base mixture of Example 2b is suitable.

b) The ferroelectric mixture comprising

| mixture from Example 2b | 94 mol-% |
|---|---|

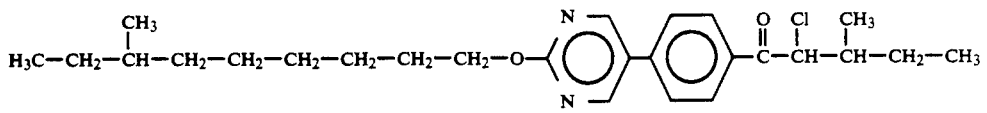 6 mol-%

4-[2-((S)-7-methylnonoxy)pyrimidin-5-yl]phenyl (2S,3S)-2-chloro-3-methylpentanoate
exhibits the following liquid-crystalline phase ranges:
X −7  $S_c$ 79  $S_A$ 84  N 99  I At 25° C., this mixture has a spontaneous polarization of −9 nC cm$^{-2}$, a contrast of 5.6 and, in a switching field of 10 V$\mu$m$^{-1}$, a switching time of 60 $\mu$s.

Compared with the mixture 9a, this mixture contains no component of the general formula VI and, in comparison, has a melting point which is 2° C. higher and a switching time which is 5 $\mu$s longer.

Example 9

A ferroelectric mixture comprising the following four components

At 25° C., this mixture has a polarization of −8.7 nC cm$^{-2}$ a contrast of 6.6 [lacuna] in a switching field of 10 V$\mu$m$^{-1}$, a switching time of 50 $\mu$s.

Compared with the mixture 8b, which differs from the mixture 9 only in that it contains no compound of the general formula V, the mixture 9 has a contrast which is higher by 18%, a melting point which is lower by 4° C. and a switching time which is shorter by 10 $\mu$s.

Example 10

A ferroelectric mixture comprising the following

| mixture from Example 2b | 64 mol-% |
|---|---|

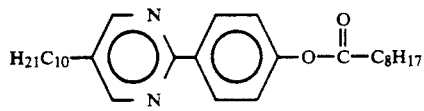 15 mol-%

4-(decylpyrimidin-2-yl)phenyl nonanoate (compound of the general formula V)

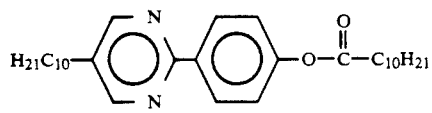 15 mol-%

4-(5-decylpyrimidin-2-yl)phenyl undecanoate (compound of the general formula V)

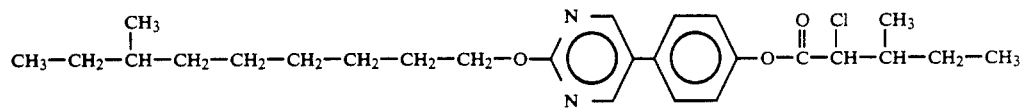 6 mol-%

4-[2-(S)-7-methylnonoxypyrimidin-5-yl]phenyl(2S,3S)-2-chloro-3-methylpentanoate
exhibits the following liquid-crystalline phase ranges:
X −11  $S_c$* 75  $S_A$* 90  N* 85  I components

| mixture from Example 2a | 89 mol-% |
|---|---|

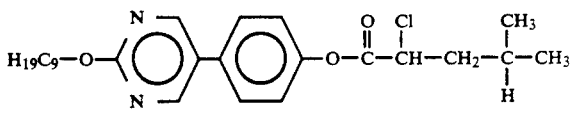 5 mol-%

4-(2-nonoxypyrimidin-5-yl)phenyl
2-chloro-4-methyl-pentanoate (racemate)
(compound of the general formula IX)

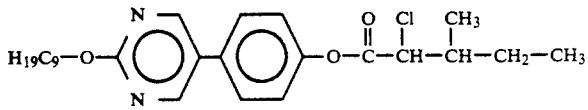 6 mol-%

4-(2-nonoxypyrimidin-5-yl)phenyl
(2S,3S)-2-chloro-3-methylpentanoate
has the phase sequence X —9 $S_c^*$ 72 $S_A^*$ 77 N* 88 I At 25° C., this mixture has a polarization of −8.7 nC cm$^{-2}$, a contrast of 8 and, in a switching field of 10 V$\mu$m$^{-1}$, a switching time of 60 $\mu$s.

Compared with the ferroelectric mixture of Example 7b, the contrast is 45% higher. The addition of the racemic α-chlorocarboxylate thus results in an increase in the contrast and a reduction in the melting point by 1° C.

Example 11 a) A ferroelectric mixture comprising the following components

| | |
|---|---|
| mixture from Example 3a | 88 mol-% |
| 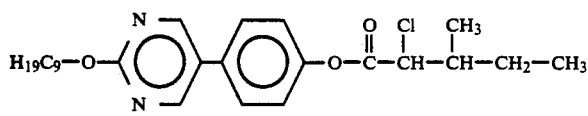 4-(2-nonoxypyrimidin-5-yl)phenyl (2S,3S)-2-chloro-3-methylpentanoate | 12 mol-% | has the phase sequence
X —7 $S_c^*$ 68 $S_A^*$ 74 N* 85 I

At 25° C., this mixture has a polarization of −20n C cm$^{-2}$ [sic], a contrast of 8.2 and, in a switching field of 10V$\mu$m$^{-1}$, a switching time of 18 $\mu$s.

b) A ferroelectric mixture comprising

| | |
|---|---|
| mixture from Example 3a | 85 mol-% |
| 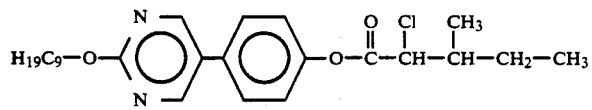 4-(2-nonoxypyrimidin-5-yl)phenyl (2S,3S)-2-chloro-3-methylpentanoate | 12 mol-% |
| 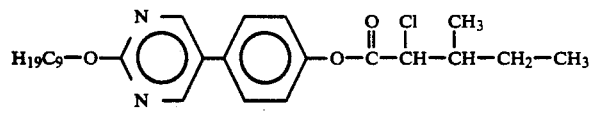 4-(2-nonoxypyrimidin-5-yl)phenyl 2-chloro-4-methylpentanoate (racemate) | 3 mol-% | has the phase sequence

| X —8 | $S_c^*$ 68 | $S_A^*$ 75 | N* 85.5 | I |
|---|---|---|---|---|

At 25° C., this mixture has a polarization of −20 nC cm$^{-2}$, a contrast of 8.9 and, in a switching field of 10 V$\mu$m$^{-1}$, a switching time of 17 $\mu$s. Compared with the ferroelectric mixture in Example 11a, the contrast is higher. The addition of the racemic α-chlorocarboxylate thus results in an increase in the contrast by 9%.

Examples 12a-c

The following ferroelectric mixtures comprising the following components

X mol % of the mixture from Example 3a
Y mol % of the racemic mixture of

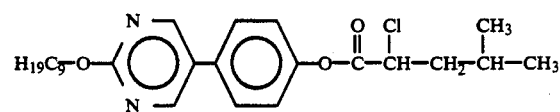

4-(3-nonoxypyrimidin-5-yl)phenyl 2-chloro-4-methylpentanoate 6 mol % of
4-(2-nonoxypyrimidin-5-yl)phenyl (2S,3S)-2-chloro-3-methylpentanoate

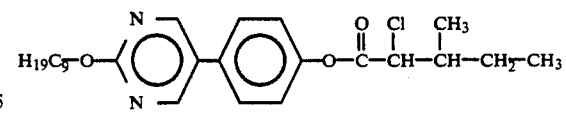

In Table 2 below, the property features (at 25° C.) of the examples have been summarized.

TABLE 2

| Example | Concentration X Mol % | Concentration Y Mol % | Contrast K | Switching time $\tau$ $\mu s$ | Polarization $P_s$ nC·cm$^{-2}$ | Phase-transition temperatures X→$S_c$* °C. | $S_c$*→$S_A$* °C. | $S_A$*→N* °C. | N*→I °C. |
|---|---|---|---|---|---|---|---|---|---|
| 12a | 94 | 0 | 4.5 | 43 | −9.8 | −6 | 70 | 77 | 86 |
| 12b | 91 | 3 | 4.6 | 44 | −9.6 | −5.3 | 69 | 77 | 85 |
| 12c | 88 | 6 | 5.8 | 45 | −9.2 | −5.5 | 68 | 76 | 84 |

The results in columns 3 and 4 show very clearly the improvement in the contrast with the increase in the concentration of the racemic mixture of the α-chlorocarboxylate (Y).

Examples 13a-c

The following ferroelectric mixtures comprise the following components

X mol % of the mixture from Example 1a
Y mol % of the racemic mixture of

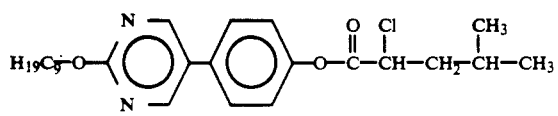

4-(2-nonoxypyrimidin-5-yl)phenyl 2-chloro-4-methylpentanoate
6 mol % of
4-(2-octoxypyrimidin-5-yl)phenyl (2S,3S)-2-chloro-3-methylpentanoate

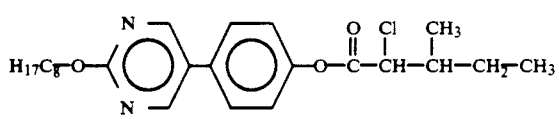

In Table 3 below, the property features (at 25° C.) of the examples are reproduced in a summarized form.

TABLE 3

| Example | Concentration X Mol % | Concentration Y Mol % | Contrast K | Switching time $\tau$ $\mu s$ | Polarization $P_s$ nC·cm$^{-2}$ | Phase-transition temperatures X→$S_c$* °C. | $S_c$*→$S_A$* °C. | $S_A$*→N* °C. | N*→I °C. |
|---|---|---|---|---|---|---|---|---|---|
| 13a | 94 | 0 | 4.5 | 43 | −9.8 | −6 | 71 | 78 | 89 |
| 13b | 91 | 3 | 4.7 | 52 | −9.5 | −6 | 71 | 77 | 88 |
| 13c | 88 | 6 | 6.2 | 53 | −9.2 | −6 | 70 | 77 | 86 |

The results in columns 3 and 4 show very clearly the improvement in the contrast with the increase in the concentration of the racemic mixture of the α-chlorocarboxylate (Y).

Example 14 a) A liquid-crystalline mixture comprising the following five components

| | |
|---|---|
| 5-octoxy-2-(4-decoxyphenyl)pyrimidine | 21 mol-% |
| 5-octoxy-2-(4-octoxyphenyl)pyrimidine | 12 mol-% |
| 5-octoxy-2-(4-hexoxyphenyl)pyrimidine | 25 mol-% |
| 5-octoxy-2-(4-butoxyphenyl)pyrimidine | 27 mol-% |
| 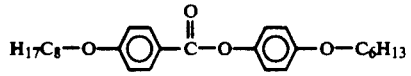 | 15 mol-% |

4'-hexoxyphenyl 4-octoxybenzoate
(= compound of the general formula VII)
has the following liquid-crystalline phase ranges:
X 8 $S_c$ 72.3 $S_A$ 86.1 N 93 I b) A mixture without addition of 15 mol-% of the compound of the general formula (VII) has, by contrast, the following liquid-crystalline phase ranges:

| | | | | |
|---|---|---|---|---|
| X 13 | $S_c$ 81.5 | $S_A$ 95.5 | N 98 | I |

Compared with mixture 14b, the mixture 14a according to the invention additionally contains a component of the general formula (VII) and has, in comparison, a melting point which is lower by 5° C. and an upper $S_c$ phase-range limiting temperature which is lower by 9.5° C.

Example 15

A liquid-crystalline mixture comprising the following five components

| | |
|---|---|
| mixture from Example 14b | 80 mol-% |
| 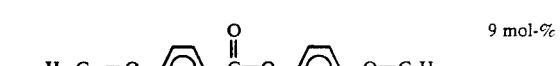 | 20 mol-% |

4-hexoxyphenyl 4'-decoxybenzoate
(compound of the general formula VII)
has the following liquid-crystalline phase ranges:
X 9 $S_c$ 72.6 $S_A$ 87.3 N 92.5 I Compared with the mixture 14b, the mixture additionally contains a component of the general formula (VII) and has, in comparison, a melting point which is lower by 4° C. and an $S_c$ phase-range limiting temperature which is lower by 9° C.

Example 16

A liquid-crystalline mixture comprising the following six components

| | |
|---|---|
| 5-octoxy-2-(4-decoxyphenyl)pyrimidine | 20 mol-% |
| 5-octoxy-2-(4-octoxyphenyl)pyrimidine | 11 mol-% |
| 5-octoxy-2-(4-hexoxyphenyl)pyrimidine | 24 mol-% |
| 5-octoxy-2-(4-butoxyphenyl)pyrimidine | 25 mol-% |
| $H_{21}C_{10}$—O—⟨O⟩—C(=O)—O—⟨O⟩—O—$C_6H_{13}$ | 9 mol-% |

4-hexoxyphenyl 4'-decoxybenzoate
(= compound of the general formula VII)

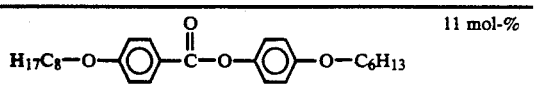

4-hexoxyphenyl 4-octoxybenzoate
(compound of the general formula VII)
has the following liquid-crystalline ranges:
X 6 $S_c$ 72.3 $S_A$ 85.2 N 92 I b) A four-component mixture which differs from the liquid-crystal mixture 16a only in that it contains no compound of the general formula (VII) has the following liquid-crystalline phase ranges:

| X 13 | $S_c$ 81.5 | $S_A$ 95.5 | N 98 | I |

Compared with the mixture 16b, the mixture 16a according to the invention has a melting point which is lower by 7° C. and a upper $S_c$ phase-range limiting temperature which is lower by 9° C.

Example 17

A ferroelectric mixture comprising the following components

| mixture from Example 3a | 82 mol-% |

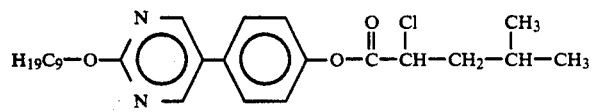

3 mol-%

Racemate of 4-(2-nonoxypyrimidin-5-yl)phenyl
2-chloro-4-methylpentanoate

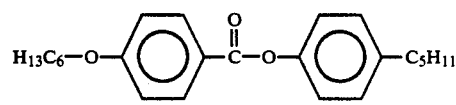

9 mol-%

4-pentylphenyl 4'-hexoxybenzoate
(compound of the general formula VIII)

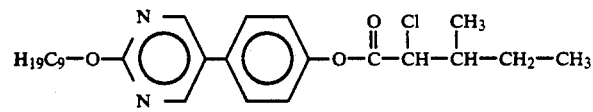

6 mol-%

4-(2-nonoxypyrimidin-5-yl)phenyl (2S,3S)-
2-chloro-3-methylpentanoate
has the following LC ranges:
X −9 $S_c$* 61 $S_A$* 70 N* 85 I At 20° C., this mixture has a polarization of −8.2 nC cm$^{-2}$, a contrast of 5.7 and, in a switching field of 10 V$\mu$m$^{-1}$, a switching time of 54 $\mu$s. Comparison with the mixture from Example 12b confirms that the addition of the ester of the general formula (VIII) reduces the melting point by 4° C. and increases the contrast by 24%.

Example 18 a) A liquid-crystalline mixture comprising the following nine components

| 5-octoxy-2-(4-hexoxyphenyl)pyrimidine | 14 mol-% |

| 5-octoxy-2-(4-octoxyphenyl)pyrimidine | 5 mol-% |
| 5-octoxy-2-(4-butoxyphenyl)pyrimidine | 15 mol-% |
| 5-octoxy-2-(4-decoxyphenyl)pyrimidine | 8 mol-% |
| 5-octoxy-2-(4-dodecoxyphenyl)pyrimidine | 8 mol-% |
| 5-octyl-2-(4-dodecoxyphenyl)pyrimidine | 13 mol-% |
| [4-(5-decylpyrimidin-2-yl)]phenyl trans-4-pentylcyclohexanecarboxylate | 17 mol-% |

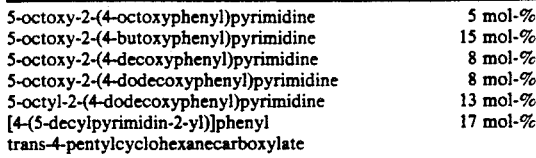

13 mol-%

4-(5-octylpyrimidin-2-yl)phenyl heptanoate
(= compound of the general formula V)

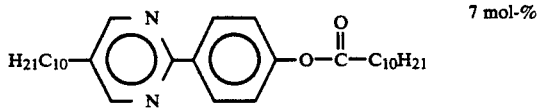

7 mol-%

4-(10-decylpyrimidin-2-yl)phenyl undecanoate
(compound of the general formula V)
exhibits the following liquid-crystalline phase ranges:
X −3 $S_c$ 73 $S_A$ 81 N 94 I b) A comparable mixture which differs from the mixture 18A only in that it contains no component of the general formula (V) has the following liquid-crystalline phase ranges:

| X −1 | $S_c$ 81 | $S_A$ 87 | N 103 | I |

The mixture according to the invention thus has a melting point which is lower by 2° C. and an upper $S_c$ phase-range limiting temperature which is lower by 8° C.

Example 19

A ferroelectric liquid-crystalline mixture comprises the following ten components

| | |
|---|---|
| 5-octoxy-2-(4-butoxyphenyl)pyrimidine | 13.2 mol % |
| 5-octoxy-2-(4-hexoxyphenyl)pyrimidine | 14 mol % |
| 5-octoxy-2-(4-octoxyphenyl)pyrimidine | 5.5 mol % |
| 5-octoxy-2-(4-decoxyphenyl)pyrimidine | 7 mol % |
| 5-octoxy-2-(4-dodecoxyphenyl)pyrimidine | 7 mol % |
| [4-(5-decylpyrimidin-2-yl)]phenyl trans-4-pentylcyclohexanecarboxylate | 16.7 mol % |
| 5-octyl-2-(4-dodecoxyphenyl)pyrimidine | 11.4 mol % |
| [4-(5'-octylpyrimidin-2-yl)]phenyl heptanoate | 13.2 mol % |
| 4-(2-nonoxypyrimidin-5-yl)phenyl 2-fluoro-4-methylpentanoate (compound of the general formula IX) | 6 mol % |
| 4-(2-nonoxypyrimidin-5-yl)phenyl (2S,3S)-2-chloro-3-methylpentanoate | 6 mol % |
| exhibits the following liquid-crystalline phase ranges: | |
| X −8    $S_c^*$ 73    $S_A^*$ 80    $N^*$ 90    I | | and has, at 25° C., a spontaneous polarization of 9.4 nC cm$^{-2}$, a contrast of 5.8 and a switching time of 65 μs.

By comparison, the claimed ferroelectric FLC mixture from Example 7a, which differs from the abovementioned ferroelectric mixture only in that it contains no racemate (IX), has the following phase ranges:

| | |
|---|---|
| X −1    $S_c^*$ 80    $S_A^*$ 85    $N^*$ 99    I | |

In comparison, the abovementioned ferroelectric mixture has a melting point which is lower by 7° C.

Example 20 a) A liquid-crystalline mixture comprising the following six components

| | |
|---|---|
| 5-oxtoxy-2-(4-hexoxyphenyl)pyrimidine | 20.2 mol-% |
| 5-octoxy-2-(4-octoxyphenyl)pyrimidine | 9.4 mol-% |
| 5-octoxy-2-(4-butoxyphenyl)pyrimidine | 21.4 mol-% |
| 5-octoxy-2-(4-decoxyphenyl)pyrimidine | 17 mol-% |
| [4-(5-decylpyrimidin-2-yl)]phenyl trans-4-pentylcyclohexanecarboxylate | 12 mol-% |

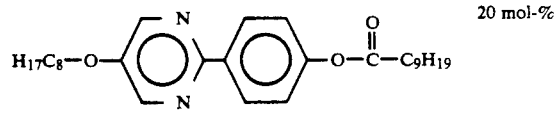

20 mol-%

[4-(5'-octoxypyrimidin-2-yl)]phenyl decanoate
(= compound of the general formula VI)
exhibits the following liquid-crystalline phase ranges:
X 8 $S_c$ 80 $S_A$ 92 N 100 I b) The following mixture, which is claimed in DE 3,831,2265.3 and differs from the mixture 20a only in that it contains no component of the general formula (VI), is suitable for comparison of the physical properties. This mixture comprising five components has the following liquid-crystalline phase ranges:

| | |
|---|---|
| X 10    $S_c$ 84    $S_A$ 93    N 105    I | |

In comparison with the mixture 1b, the mixture 20a according to the invention has a melting point (X) which is lower by 2° C. and an upper $S_c$ phase-range limiting temperature which is lower by 4° C.

We claim:

1. A liquid-crystalline mixture containing, as component A, at least two 5-alkoxy-2-(alkoxyphenyl)pyrimidines of the general formula (I)

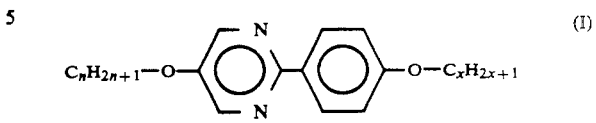

in which the alkyl radicals are straight-chain alkyl radicals in which n is an integer from 6 to 14 and x is an integer from 2 to 14, wherein the liquid-crystal mixture furthermore contains at least one component c of the general formula (V), (VI), (VII), (VIII) or the racemic mixture of one or more carboxylates of the general formula (IX) as a mixture component:

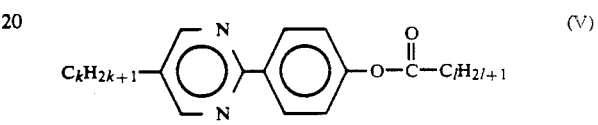

where
k may be an integer from 6 to 14, and
l may be an integer from 2 to 14,

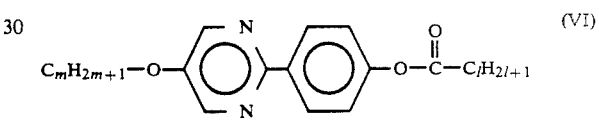

where
m may be an integer from 5 to 14, and
l may be an integer from 2 to 14,

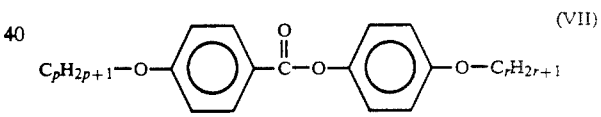

where
p may be an integer from 7 to 14, and
r may be an integer from 4 to 14,

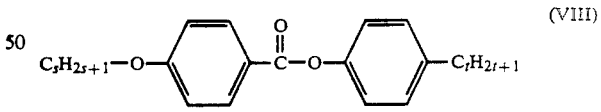

where
s may be an integer from 6 to 14, and
t may be an integer from 6 to 14,

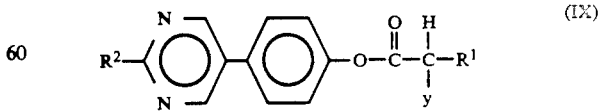

where
R$^2$ is straight-chain or branched (C$_1$-C$_{12}$)alkyl or alkenyl, it being possible for one or two non-adjacent CH$_2$ groups to be replaced by O and/or S atoms,
y is F, Cl, Br, CN or CF$_3$ and $R^1$ is branched ($C_3$-$C_9$)alkyl, benzyl or phenyl.

2. A liquid-crystalline mixture as claimed in claim 1, which contains, as component C, one or more 4-(5-alkylpyrimidin-2-yl)phenyl carboxylates of the general formula (V)

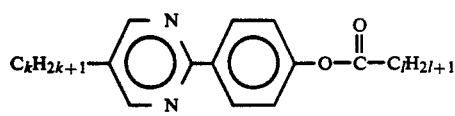
(V)

where
k may be an integer from 6 to 14, and
l may be an integer from 4 to 14.

3. A liquid-crystalline mixture as claimed in claim 1, which contains, as component C, one or more 4-(5-alkoxypyrimidin-2-yl)phenyl carboxylates of the general structure (VI)

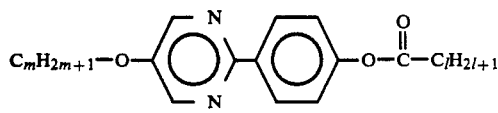
(VI)

where
m may be an integer from 6 to 14, and
l may be an integer from 4 to 14.

4. A liquid-crystalline mixture as claimed in claim 1, which contains, as component C, one or more benzoates of the general structure (VII)

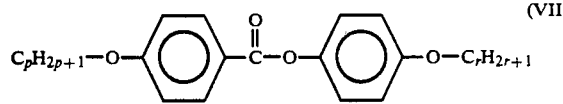
(VII)

where
p may be an integer from 7 to 14, and
r may be an integer from 4 to 14.

5. A liquid-crystalline mixture as claimed in claim 1, which contains, as component C, one or more benzoates of the general structure (VIII)

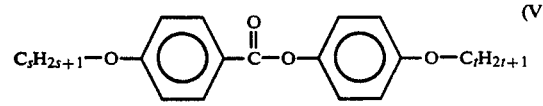
(VIII)

where
s may be an integer from 6 to 14, and
t may be an integer from 6 to 14.

6. A liquid-crystalline mixture as claimed in claim 1, which contains, as component C, the racemic mixture of one or more of the following carboxylates of the general structure (IX)

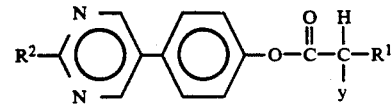
(IX)

where
$R^2$ is straight-chain or branched ($C_1$-$C_{12}$)alkyl or alkenyl, it being possible for one or two nonadjacent $CH_2$ groups to be replaced by O and/or S atoms, y is F or Cl and
$R^1$ is branched ($C_3$-$C_9$)alkyl, benzyl or phenyl.

7. A liquid-crystalline mixture as claimed in claim 1, which contains, as component C, the racemic mixture of one or more of the following carboxylates of the general structure (IXa)

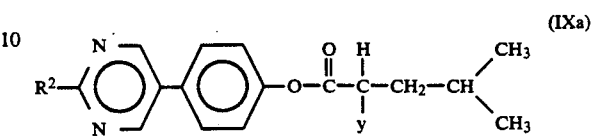
(IXa)

where
$R^2$ is straight-chain or branched ($C_1$-$C_{12}$)alkyl or alkenyl, it being possible for one or two nonadjacent $CH_2$ groups to be replaced by O and/or S atoms, and
y is F or Cl.

8. A liquid-crystalline mixture as claimed in claim 1, which contains, as component C, the racemate of the following ester (IXb)

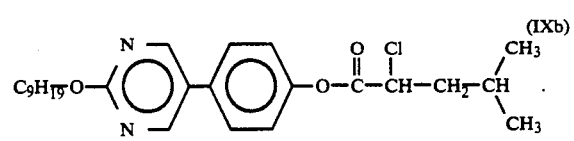
(IXb)

9. A liquid-crystalline mixture as claimed in claim 1, which contains, as component C, the racemate of the following ester (IXc)

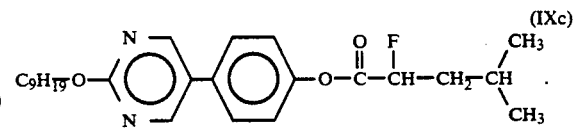
(IXc)

10. A liquid-crystalline mixture as claimed in any one of claims 6 to 9, which contains, as component C, 2 to 20 mol-% of one or more of the racemic α-substituted carboxylates.

11. A liquid-crystalline mixture as claimed in claim 1, which contains, as component C, 2 to 40 mol-% of one or more of the mixture components of the general formula (V) and/or (VI) and/or (VII) and/or (VIII).

12. A liquid-crystalline mixture as claimed in claim 1, which further contains one or more cyclohexanecarboxylates of the general formula (II)

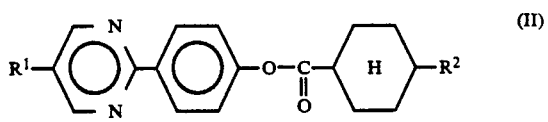
(II)

in which $R^1$ is an alkyl radical having 10 to 16 carbon atoms or an alkoxy radical having 8 to 14 carbon atoms, and $R^2$ is an alkyl radical having 2 to 9 carbon atoms.

13. A liquid-crystalline mixture as claimed in claim 1, which further contains one or more alkenyloxyphenylpyrimidine derivatives of the general formula (III)

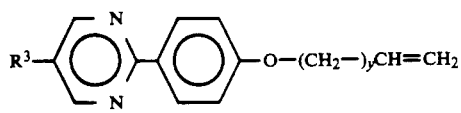 (III)

in which $R^3$ is an alkyl chain having 7 to 16 carbon atoms or an alkoxy chain having 6 to 14 carbon atoms, and y is an integer from 4 to 14.

14. A liquid-crystalline mixture as claimed in claim 1, which further contains one or more alkylpyrimidinealkoxyphenyl derivatives of the general formula (IV)

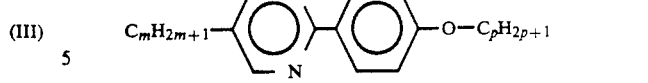 (IV)

in which m and p, independently of one another, are integers from 6 to 14.

15. A liquid-crystalline mixture as claimed in claim 1, which further contains as component B (for ferroelectric liquid-crystal mixtures), at least one optically active compound from the group
a) optically active esters made from α-chlorocarboxylic acids and mesogenic phenols,
b) optically active esters of N-acylpropline,
c) optically active esters of 1,3-dioxolane-4-carboxylic acids,
d) optically active esters of oxirane-2-carboxylic acids.

* * * * *